Figure 1:
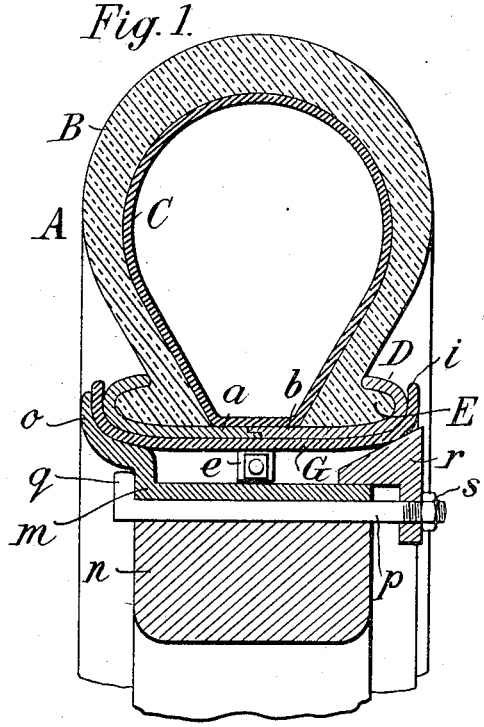

M. C. SCHWEINERT.
DEMOUNTABLE TIRE AND RIM.
APPLICATION FILED MAR. 4, 1910.

1,164,963.

Patented Dec. 21, 1915.

WITNESSES:
Fred White
René Bruine

INVENTOR:
Maximilian Charles Schweinert,
By Attorneys,
Arthur C. Fraser & Haine

UNITED STATES PATENT OFFICE.

MAXIMILIAN CHARLES SCHWEINERT, OF WEST HOBOKEN, NEW JERSEY.

DEMOUNTABLE TIRE AND RIM.

1,164,963.   Specification of Letters Patent.   Patented Dec. 21, 1915.

Application filed March 4, 1910. Serial No. 547,252.

*To all whom it may concern:*

Be it known that I, MAXIMILIAN CHARLES SCHWEINERT, a citizen of the United States, residing in West Hoboken, in the county of Hudson and State of New Jersey, have invented certain new and useful Improvements in Demountable Tires and Rims, of which the following is a specification.

This invention relates to so-called demountable or detachable tires and rims for vehicles, and aims to provide certain improvements therein.

It has heretofore been proposed to provide a rim which is detachable from the felly of the vehicle wheel, such rim having means for holding a pneumatic tire in position thereon, so that the latter may be carried in an inflated condition detached from the wheel, and substituted for any of the tires of the vehicle in case of accident. Such demountable tires have gone largely into use because of the rapidity with which they can be substituted for the injured tire so that the necessity for lengthy stoppages on the road has been avoided. Because of the difficulty in removing the tire from the rim, it has been proposed to split the rim circumferentially so that the tire may be placed over one section and the other section adjusted in position. This has involved the necessity of holding the sections together before the tire and rim are placed upon the felly. A number of types of fastening means have been suggested for this purpose, but so far as I am aware none of these is capable of withstanding the very heavy separating strain which is placed upon the rim sections by the inflation of the tire. After numerous experiments I have discovered a means for holding the rim sections together which cannot be separated by the pressure within the tire, and which is of simple construction and of easy application. To this end I provide a demountable rim split circumferentially into two parts, and as a holding means I provide a supplemental rim which is made in sections, which rim has side flanges which engage the side flanges of the tire rim. Preferably such supplemental rim is a complete rim made in two or more sections, preferably four, so that it may be easily adjusted in position. It is not strictly essential that the supplemental rim extend entirely around the tire rim. In other words, such supplemental rim may consist of a series of rim sections. It is important, however, if not essential, that these rim sections be of considerable length in order that they shall have an appreciable curve corresponding to the inner curve of the tire rim. This curved shape very materially increases the strength and rigidity of the supplemental rim sections, and provides a holding means of great strength relatively to the thickness of the metal.

Figure 2:
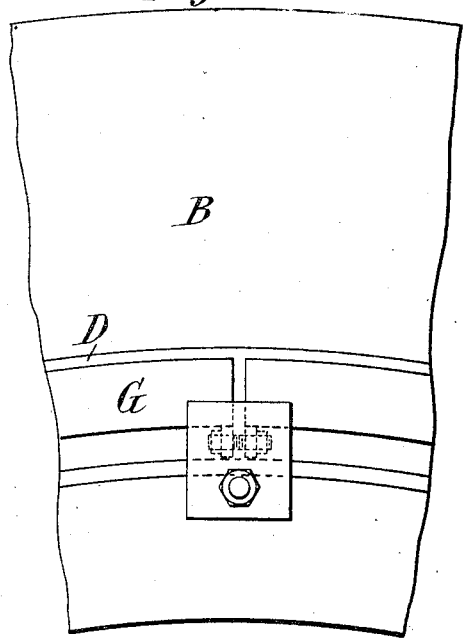
Figure 3:
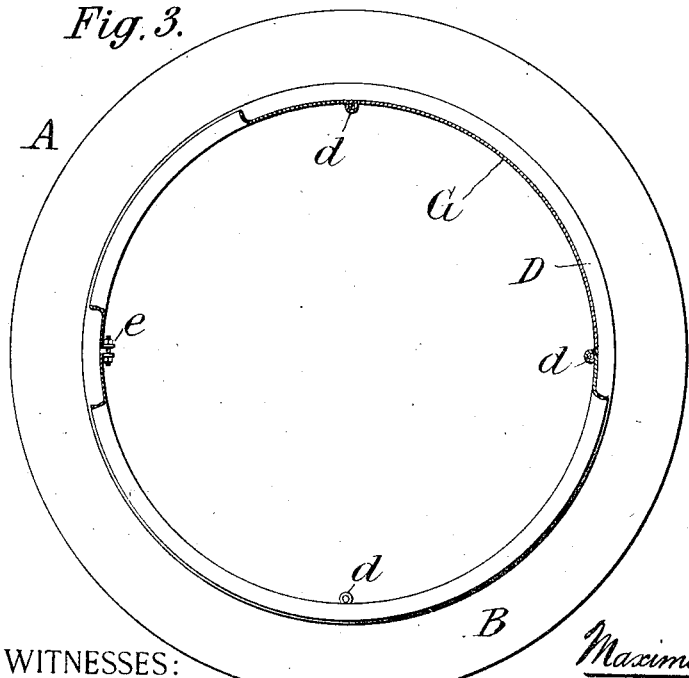
Figure 4:
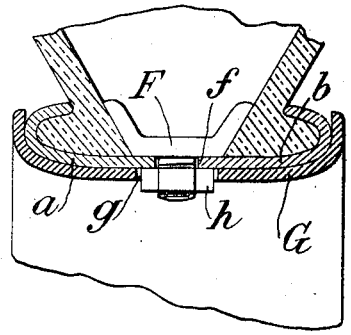

In the drawings, wherein I have shown one embodiment of my invention,—Figure 1 is a transverse section through a tire and rim illustrating the invention in its preferred form. Fig. 2 is a side elevation of a portion of the tire and rim. Fig. 3 is an elevation, partly in section of the rim and tire. Fig. 4 is a transverse section taken through one of the stay bolts.

Referring to the drawings, let A indicate a suitable pneumatic tire having an outer shoe B and an inner air tube C. The tire is mounted upon a rim D being retained thereon by enlargements or flanges E which fit in channels formed in the rim, clamping blocks or spreaders F (Fig. 4) being usually provided for holding the tire in place. So far as these features are concerned they may be of any suitable construction, although my invention is of perhaps the greatest importance in connection with the fastening means shown, which are well-known and in extended use.

The rim D is split circumferentially into two parts such as *a* and *b*. Preferably the rim is split at its middle so that holes *f* for the passage of the spreaders F, when the latter are used are formed partly in each section, although the split may be provided at any other point if desired. In the preferred form of the invention these rim sections are held together by a supplemental rim G having side flanges *i* which are adapted to engage the flanges of the tire rim.

The rim G is adapted to be applied to the rim D by a movement radially outward, and in order to facilitate this application the rim G is cut transversely at one or more places, preferably so that the rim is divided into four sections. In Fig. 3 I have shown the sections as hinged together at *d d*. Of course, in this construction at least two abutting sections will not be hinged but these may be connected when the supplemental rim is in place by a bolt *e*, or by other suitable means. When the pneumatic tire is held on its rim D by stay bolts such as F (Fig. 4) the rim D may be provided with apertures *f* through which the shank of the stay bolt passes and the rim G may be provided with suitable apertures *g* large enough to receive the nut *h* of the spreader. Or if desired the aperture *g'* may be reduced to the size of the aperture *f* and the nuts *h* engage the inner side of the rim G so that they hold the latter in place. When no stay bolts or spreaders are used, the sections of the rim G may be imperforate.

By reason of this construction the operation of fitting a tire upon the rim D is extremely short and simple. One section of the rim, such as *b*, is placed upon the floor or a table, the inner tube adjusted in the outer shoe and the latter laid over the section so that its lower enlargement E fits the channel of such section. The series of speaders F are then placed in position so that their studs extend through the holes *f*, whereupon the section *a* is adjusted in place upon its section *b*, the upper enlargement E fitting easily within the channel of the rim. The rim G (being in a somewhat collapsed condition) is then adjusted outwardly over the rim D until the rim G is fully expanded whereupon the bolt *e* may be passed through the meeting edges of the rim G and the latter thus secured in place. The flanges *i* of the rim G (Fig. 1) may be so constructed as to fit exactly over the rim D, or they may fit more or less loosely so as to permit a slight expansion of the sections *a b* after the rim is in place. Or they may be otherwise constructed to secure any desired result. If necessary during the operation of fitting a tire upon the rim D any suitable tools may be provided for holding the spreaders F in place, although this will not ordinarily be required as such spreaders are easily arranged in position before the top section of the rim is applied. This is not so, however, in the case of an undivided rim, when the use of a tool is practically necessary, particularly in the case of detachable rims wherein the studs or bolts *f* are necessarily very short. In mounting the tire in this manner there is little or no danger of pinching the inner air tube since its position is easily ascertained and controlled prior to the application of the upper section of the rim, and such application has no particular effect to alter its position. If desired the air tube can be inflated slightly prior to or during the mounting of the tire upon the rim, although this is not ordinarily necessary.

After the tire is mounted upon the rim it may be inflated to full running pressure and carried upon the car or other vehicle ready for immediate attachment to the wheel.

The tire and rim may be attached to the felly of the wheel in any suitable manner. In the drawings I have shown one form of attaching means which comprises a metal fixed rim *m* fixed to the felly *n* and provided with an outwardly extending flange *o* at one side which supports one side of the tire rim D. Bolts *p* are provided at intervals around the felly which are formed with heads *q* bearing against the rim *m*. At their opposite ends the bolts *p* are screw-threaded and pass through wedging blocks *r*, the latter being forced inwardly between the rim G and the metal rim *m* by nuts *s* as shown. The wedges *r* extend outwardly so that they engage the rim G laterally, and thus prevent any sidewise movement of the rim and support the latter at the proper points. A series of wedges are provided spaced around the wheel, with the effect that the tire rim D is wedged outwardly and laterally until it is immovable with relation to the felly. Any other suitable attaching means may be provided in lieu of that shown.

Although the specific construction shown and described is preferred, it is not strictly necessary that the rim G be a complete rim or that its sections be united. Each of the sections of the rim should preferably, however, be of considerable length in order that they may assume a curved shape, since this curved shape very materially increases the strength of the section. In other words, the flanges *i* are much better adapted to resist a lateral strain if they are of such length as to give them a substantial curve. It is practically essential that the rim G or its equivalent be provided with the flanges *i* contacting with the flanges of the tire rim. I have found in practice that the pressure developed in a fully inflated automobile tire is so great that the sections of the tire rim are extremely apt to become distorted and separate unless they are held together by a member or members such as G, wherein flanges are provided which form a channel within which the tire rim rests. While the rim G is shown as composed of connected sections, it is obvious that these may be disconnected if desired, although the construction shown is much to be preferred.

It will be observed in the construction shown and described that the circumferentially split or tire holding rim presents great strength against radially inward pressure, and that the supplementary rim presents great strength against pressure tending to laterally separate the elements of the tire holding rim. By the combination therefore pressure in any direction is adequately sustained.

While I have shown in detail one form of the invention it will be understood that changes may be made therein without departing from the spirit of the invention.

What I claim is:—

1. A demountable rim for tires, comprising a rim having tire engaging flanges, and formed in a plurality of circumferential parts, and means for locking the circumferential parts of said rim against separation, said means comprising an inner encircling member extending substantially around said rim and having side flanges extending radially outwardly in a plane beyond the side flanges of said rim, and forming lateral abutments adapted to sustain the force tending to separate the circumferential parts of said rim, said inner encircling member comprising a plurality of transversely jointed sections movable into and out of engagement with said rim.

2. A demountable rim for tires, comprising a rim having tire engaging flanges, and formed in a plurality of circumferential parts, and means for locking the circumferential parts of said rim against separation, said means comprising a supplementary inner encircling rim extending substantially around said rim and having radially outwardly extending side flanges adapted to engage the flanges of said first named rim and form lateral abutments therefor, said supplementary rim comprising a plurality of transversely hinged sections movable into and out of engagement with said first-named rim.

3. A demountable rim for tires, comprising a rim having tire engaging flanges and formed in a plurality of circumferential parts having a combined width substantially equal to the width of the base of the tire to which the rim is fitted, and adapted to sustain the inward strains of said tire on the rim, and means for locking the circumferential parts of said rim against separation, said means comprising a supplementary inner encircling rim of greater width than said rim having the circumferential parts, said inner encircling rim having side flanges adapted to engage the tire engaging flanges of said first named rim and form lateral abutments therefor, said supplementary rim comprising a plurality of adjoining sections extending substantially around said rim and adapted to sustain the transverse strains exerted by said tire on said first-named rim.

4. A demountable rim for tires, comprising a rim having tire engaging flanges and formed in a plurality of circumferential parts having a combined width substantially equal to the width of the base of the tire to which the rim is fitted, and adapted to sustain the inward strains of said tire on the rim, and means for locking the circumferential parts of said rim against separation, said means comprising a supplementary inner encircling rim of greater width than said rim having the circumferential parts, said inner encircling rim having side flanges adapted to engage the tire engaging flanges of said first named rim and form lateral abutments therefor, said supplementary rim comprising a plurality of transversely jointed sections movable into and out of engagement with said first named rim, extending substantially around said rim and adapted to sustain the transverse strains exerted by said tire on said first named rim.

5. A demountable rim for tires, comprising a rim having tire engaging flanges and formed in a plurality of circumferential parts adapted to laterally abut and having a combined width substantially equal to the width of the base of the tire to which the rim is fitted, and adapted to sustain the inward strains of said tire on the rim, and means for locking the circumferential parts of said rim against separation, said means comprising a supplementary inner encircling rim of greater width than said rim having the circumferential parts, said inner encircling rim having side flanges adapted to engage the tire engaging flanges of said first named rim and form lateral abutments therefor, said supplementary rim comprising a plurality of adjoining sections extending substantially around said rim and adapted to sustain the transverse strains exerted by said tire on said first named rim.

6. A demountable rim for tires, comprising a rim having tire engaging flanges and formed in a plurality of circumferential parts, and means for locking the circumferential parts of said rim against separation, said means comprising a supplementary inner encircling rim extending substantially around said rim and having radially outwardly extending substantially straight side flanges adapted to engage the tire engaging flanges of said first-named rim and form lateral abutments therefor, said supplementary rim comprising a plurality of joined arc-shaped sections.

In witness whereof, I have hereunto signed my name in the presence of two subscribing witnesses.

MAXIMILIAN CHARLES SCHWEINERT.

Witnesses:
  EUGENE MYLES,
  FRED WHITE.

Copies of this patent may be obtained for five cents each, by addressing the "Commissioner of Patents, Washington, D. C."